(12) United States Patent
Rup et al.

(10) Patent No.: US 10,330,453 B2
(45) Date of Patent: Jun. 25, 2019

(54) WIRELESS FASTENER GRIP GAUGE

(71) Applicant: Lockheed Martin Corporation, Bethesda, MD (US)

(72) Inventors: Tyler Martin Rup, Fort Worth, TX (US); Philip Michael Chovanec, Arlington, TX (US)

(73) Assignee: Lockheed Martin Corporation, Bethesda, MD (US)

( * ) Notice: Subject to any disclaimer, the term of this patent is extended or adjusted under 35 U.S.C. 154(b) by 154 days.

(21) Appl. No.: 15/472,784

(22) Filed: Mar. 29, 2017

(65) Prior Publication Data

US 2018/0283841 A1    Oct. 4, 2018

(51) Int. Cl.
| | | |
|---|---|---|
| *G01B 5/06* | (2006.01) | |
| *G01B 3/28* | (2006.01) | |
| *G01B 5/18* | (2006.01) | |
| *G01B 3/00* | (2006.01) | |
| *G01B 3/22* | (2006.01) | |

(52) U.S. Cl.
CPC .............. *G01B 5/06* (2013.01); *G01B 3/002* (2013.01); *G01B 3/22* (2013.01); *G01B 3/28* (2013.01); *G01B 5/18* (2013.01)

(58) Field of Classification Search
CPC ... G01B 5/06; G01B 3/28; G01B 5/02; G01B 5/18
USPC ....... 33/836, 1 BB, 719, 783, 784, 832, 833, 33/542
See application file for complete search history.

(56) References Cited

U.S. PATENT DOCUMENTS

| | | | |
|---|---|---|---|
| 4,112,355 A | | 9/1978 | Gibson, Jr. et al. |
| 4,216,585 A | * | 8/1980 | Hatter ............... G01B 5/18 33/836 |
| 5,013,318 A | | 5/1991 | Spranza, III |
| 5,095,638 A | * | 3/1992 | David ............... G01B 7/06 33/504 |
| 5,189,808 A | | 3/1993 | Evans et al. |
| 5,497,560 A | | 3/1996 | Pasquerella et al. |
| 5,657,550 A | * | 8/1997 | Struble .............. G01B 5/14 33/544.4 |
| 5,673,839 A | | 10/1997 | Howard et al. |
| 5,729,906 A | | 3/1998 | Banks et al. |

(Continued)

FOREIGN PATENT DOCUMENTS

WO    98/26720    6/1998

OTHER PUBLICATIONS

European Patent Office, Extended European Search Report and Annex to the European Search Report for Application No. / Patent No. EP 18163492.4-1022, dated May 18, 2018.

*Primary Examiner* — Christopher W Fulton
(74) *Attorney, Agent, or Firm* — Baker Botts, L.L.P.

(57) ABSTRACT

An apparatus comprises a pin, a stop, a spring, one or more flanges, a measurement device, and a transmitter. The pin comprises a first end configured for insertion in an aperture in a component. The stop is slidably engaged with the pin and configured to contact a first surface of the component as the pin is inserted into the aperture in the component. The spring couples the stop to the housing. The one or more flanges are located proximate to the first end of the pin. The one or more flanges are configured to contact a second surface of the component. The measurement device is coupled to the pin. The transmitter is communicatively coupled to the measurement device.

20 Claims, 6 Drawing Sheets

(56) References Cited

U.S. PATENT DOCUMENTS

| | | | |
|---|---|---|---|
| 5,746,003 A | 5/1998 | Baruchello | |
| 6,058,598 A * | 5/2000 | Dixon | B23P 19/001 |
| | | | 29/709 |
| 7,065,897 B2 | 6/2006 | Luner et al. | |
| 7,134,216 B2 * | 11/2006 | Rupp | A61B 5/1072 |
| | | | 33/512 |
| 7,665,221 B2 | 2/2010 | Bennison et al. | |
| 7,895,767 B2 | 3/2011 | Harshbarger et al. | |
| 7,913,414 B2 | 3/2011 | Bumgardner et al. | |
| 8,336,222 B1 | 12/2012 | Kostenick, Jr. et al. | |
| 8,365,428 B2 | 2/2013 | Miller et al. | |
| 8,512,349 B2 * | 8/2013 | Mengato | A61B 90/06 |
| | | | 33/512 |
| 8,606,540 B2 | 12/2013 | Haisty et al. | |
| 9,157,735 B2 | 10/2015 | Haisty et al. | |
| 2003/0212349 A1 | 11/2003 | Meier | |
| 2006/0116637 A1 | 6/2006 | Shirley et al. | |
| 2006/0207118 A1 * | 9/2006 | Kim | A61B 5/1076 |
| | | | 33/512 |
| 2007/0088366 A1 * | 4/2007 | Fernandez | A61B 5/103 |
| | | | 606/102 |
| 2008/0104855 A1 * | 5/2008 | Kim | G01B 3/28 |
| | | | 33/836 |
| 2015/0192410 A1 | 7/2015 | Bumgardner et al. | |
| 2016/0178343 A1 | 6/2016 | Hale et al. | |

* cited by examiner

WIRELESS FASTENER GRIP GAUGE

TECHNICAL FIELD

The present disclosure relates in general to measurement tools, and more particularly to a wireless fastener grip gauge.

BACKGROUND

The manufacture of aircraft and other vehicles often requires the assembly of numerous components using fasteners. It is important that the fasteners installed have the right grip length in order to ensure that the component tightens down properly. If a component does not tighten down properly, gaps or areas of force concentration may arise that can cause fracturing. This can be problematic, especially when the assembly of aircraft or other vehicles is required to meet tight tolerances. Existing approaches suffer from certain deficiencies. For example, existing approaches to measuring grip length are manual and of questionable accuracy.

SUMMARY

According to embodiments of the present disclosure, disadvantages and problems associated with previous techniques for measuring grip length may be reduced or eliminated.

According to an example embodiment, an apparatus is disclosed. The apparatus comprises a pin, a housing, a stop, a spring, one or more flanges, a linear displacement metrology device, and a transmitter. The pin comprises a first end configured for insertion in an aperture in a component. The housing is affixed proximate to a second end of the pin. The stop is slidably engaged with the pin and configured to contact a first surface of the component as the pin is inserted into the aperture in the component. The spring couples the stop to the housing. The spring is configured to compress when the stop contacts the first surface of the component as the pin is inserted in the aperture in the component. The one or more flanges are located proximate to the first end of the pin. The one or more flanges are configured to transition between a first retracted state during insertion of the pin and a second extended state when the first end of the pin passes through the aperture in the component. The one or more flanges are configured to contact a second surface of the component when in the second extended state. The linear displacement metrology device is coupled to the pin such that an axis of the linear displacement metrology device is substantially aligned with an axis of the pin. The transmitter is communicatively coupled to the linear displacement metrology device. The transmitter is located in the housing and configured to communicate to a receiver a value indicating a grip length of a fastener for use in the aperture in the component.

According to another example embodiment, an apparatus is disclosed. The apparatus comprises a pin, a stop, a spring, one or more flanges, a measurement device, and a transmitter. The pin comprises a first end configured for insertion in an aperture in a component. The stop is slidably engaged with the pin and configured to contact a first surface of the component as the pin is inserted into the aperture in the component. The spring couples the stop to the housing. The one or more flanges are located proximate to the first end of the pin. The one or more flanges are configured to contact a second surface of the component. The measurement device is coupled to the pin. The transmitter is communicatively coupled to the measurement device.

According to another example embodiment, a method is disclosed. The method comprises inserting a first end of a pin of a grip gauge into an aperture in a component. The method comprises determining a grip length for a fastener to be used in the aperture in the component, the grip length determined based on a measurement performed using a measurement device coupled to the pin of the grip gauge. The method comprises transmitting a value indicating the determined grip length to a receiver.

Certain embodiments may have one or more technical advantages. For example, certain embodiments may advantageously reduce the subjectivity of measurements due to variation among operators and reduce the number of operator motions required to operate the apparatus. For example, certain embodiments may only require the operator to insert the pin. The gauge may advantageously measure the part and transmit the data on its own, thereby requiring the operator to simply move the pin from aperture to aperture. Other advantages may be readily apparent to one having skill in the art. Certain embodiments may have none, some, or all of the recited advantages.

BRIEF DESCRIPTION OF THE DRAWINGS

For a more complete understanding of the disclosed embodiments and their features and advantages, reference is now made to the following description, taken in conjunction with the accompanying drawings, in which.

DETAILED DESCRIPTION

As described above, it is important during the manufacturing process of aircraft and other vehicles or machinery that the fasteners installed into a drilled aperture are the right grip length in order to ensure that the part tightens down properly. If a part does not tighten down properly, there could be gaps that arise or areas of force concentration that can cause fracturing. Existing approaches to measuring grip length are manual and of questionable accuracy.

One existing approach, for example, is a manual tool that consists of a hook and a slider. An operator hooks the gauge on the backside of the aperture and slides the slider up to the surface of the part. The location of the front end of the slider (as read by the operator) will indicate the length needed. Another existing approach consists of a depth gauge attached to a slider. An operator pulls back on a slider mechanism to reveal a hook. The hook is then placed on the backside of the aperture and the operator pushes the slide mechanism closed in order to clamp the hook to the part.

There are a number of deficiencies associated with the above approaches. For example, the first solution is an entirely manual method that is susceptible to operator variation and misinterpretation, especially at the edges of the ranges for each value. The hooking operation can also lead to the gauge not being centered or perpendicular to the surface, which can cause measurements to be skewed. The second existing approach described above requires a number of motions and inputs from the operator in order to operate, and is very tiresome to operate due to poor ergonomic design. Similar to the first approach, the hooking operation can lead to the gauge not being centered or perpendicular to the surface, which can cause measurements to be skewed. Thus, there is a need for an improved apparatus, system, and method for measuring the required grip length for a fastener.

The present disclosure contemplates various embodiments that may address these and other deficiencies associated with existing approaches. According to one example embodiment, an apparatus is disclosed. The apparatus comprises a pin, a housing, a stop, a spring, one or more flanges, a linear displacement metrology device, and a transmitter. The pin comprises a first end configured for insertion in an aperture in a component. The housing is affixed proximate to a second end of the pin. The stop is slidably engaged with the pin and configured to contact a first surface of the component as the pin is inserted into the aperture in the component. The spring couples the stop to the housing. The spring is configured to compress when the stop contacts the first surface of the component as the pin is inserted in the aperture in the component. The one or more flanges are located proximate to the first end of the pin. The one or more flanges are configured to transition between a first retracted state during insertion of the pin and a second extended state when the first end of the pin passes through the aperture in the component. The one or more flanges are configured to contact a second surface of the component when in the second extended state. The linear displacement metrology device is coupled to the pin such that an axis of the linear displacement metrology device is substantially aligned with an axis of the pin. The transmitter is communicatively coupled to the linear displacement metrology device. The transmitter is located in the housing and configured to communicate to a receiver a value indicating a grip length of a fastener for use in the aperture in the component.

According to another example embodiment, an apparatus is disclosed. The apparatus comprises a pin, a stop, a spring, one or more flanges, a measurement device, and a transmitter. The pin comprises a first end configured for insertion in an aperture in a component. The stop is slidably engaged with the pin and configured to contact a first surface of the component as the pin is inserted into the aperture in the component. The spring couples the stop to the housing. The one or more flanges are located proximate to the first end of the pin. The one or more flanges are configured to contact a second surface of the component. The measurement device is coupled to the pin. The transmitter is communicatively coupled to the measurement device.

According to another example embodiment, a method is disclosed. The method comprises inserting a first end of a pin of a grip gauge into an aperture in a component. The method comprises determining a grip length for a fastener to be used in the aperture in the component, the grip length determined based on a measurement performed using a measurement device coupled to the pin of the grip gauge. The method comprises transmitting the determined grip length to a receiver.

Certain embodiments may have one or more technical advantages. For example, certain embodiments may advantageously reduce the subjectivity of measurements due to variation among operators and reduce the number of operator motions required to operate the apparatus. For example, certain embodiments may only require the operator to insert the pin and then, due to the spring-flange mechanism and linear displacement metrology device (which may, in certain embodiments, include a timer), the apparatus measures the part and transmits the data on its own, thereby requiring the operator to simply move the pin from aperture to aperture. Other advantages may be readily apparent to one having skill in the art. Certain embodiments may have none, some, or all of the recited advantages.

Figure 1:
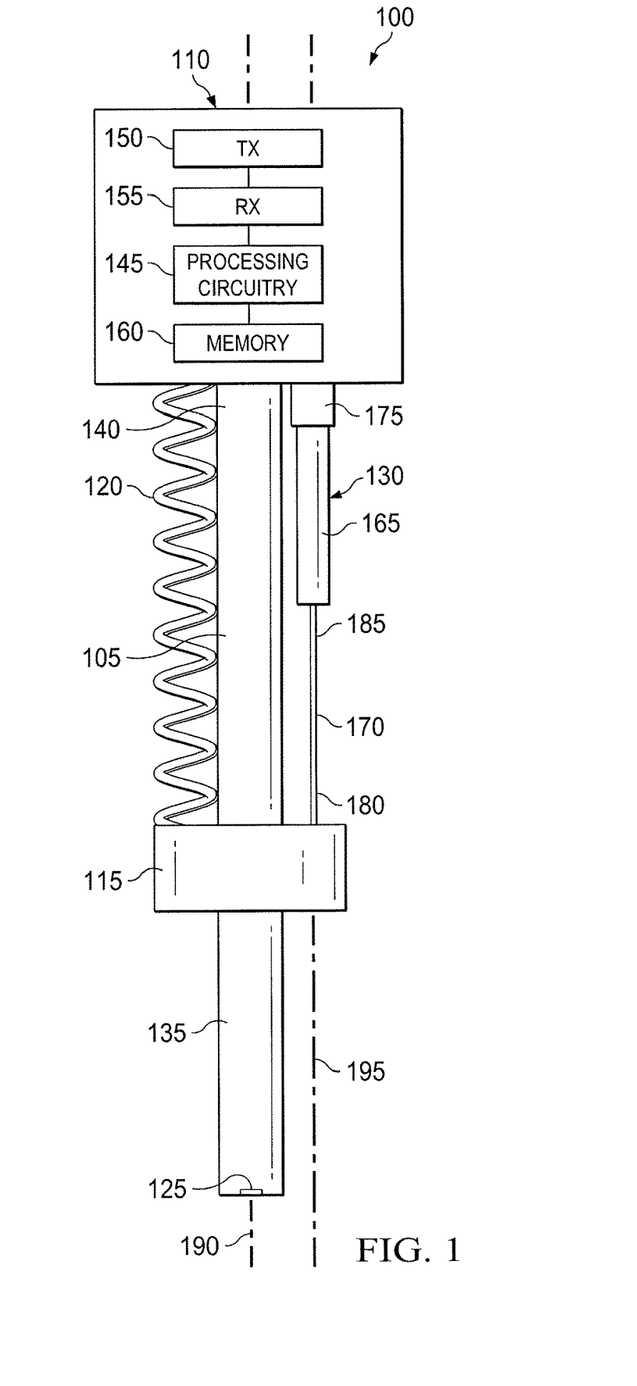
FIG. 1 illustrates an example apparatus, in accordance with certain embodiments.

FIG. 1 illustrates an example apparatus 100, in accordance with certain embodiments. Apparatus 100 includes a pin 105, a housing 110, a stop 115, a spring 120, one or more flanges 125, and a measurement device 130.

Pin 105 comprises a first end 135 and a second end 140. First end 135 is configured for insertion in an aperture in a component in which a fastener is intended to be used. Second end 140 is coupled to housing 110. In certain embodiments, pin 105 may be removably coupled to housing 110.

Pin 105 may have any suitable shape and dimensions, and the shape and dimensions of pin 105 may vary according to different implementations of apparatus 100. For example, in certain embodiments pin 105 is sized to a specific diameter of the aperture being measured. As another example, in certain embodiments pin 105 may be designed for use with different sized apertures, and the diameter of pin 105 may be slightly less than the diameter of the smallest aperture with which pin 105 may be used. In certain embodiments, pin 105 may have a shape and dimensions that correspond to the shape and dimensions of the aperture in which pin 105 is to be inserted. This may advantageously restrict movement of pin 105 as it moves in and out of the aperture in the component, thereby preventing differences in measurements due to variations in an amount of movement of pin 105 among operators. Pin 105 may be made from any suitable material. As particular examples, pin 105 may be made from metal (e.g., aluminum), rubber, or plastic (e.g., Delrin®), or any other suitable material or any suitable combination of materials.

Stop 115 is slidably engaged with pin 105. Stop 115 is coupled to spring 120 and measurement device 130. Stop 115 is configured to contact a first surface of the component as pin 105 is inserted into the aperture in the component. Stop 115 may have any suitable dimensions and may be made of any suitable material. The dimensions and material forming stop 115 may vary according to different implementations of apparatus 100. As a particular example, stop 115 may be formed of rubber.

Spring 120 couples stop 115 to housing 110. In its resting state, spring 120 is extended. In certain embodiments, in its resting state spring 120 may be extended such that stop 115 is substantially co-located with first end 135 of pin 105. In other words, spring 120 may have a substantially similar length as pin 105 when in its resting position. Spring 120 is configured to compress when stop 115 contacts the first surface of the component as pin 105 is inserted in the aperture in the component.

One or more flanges 125 are located proximate to first end 135 of pin 105. One or more flanges 125 are configured to transition between a first retracted state during insertion of the pin and a second extended state when first end 135 of pin 105 passes through the aperture in the component. As described in more detail below, one or more flanges 125 are configured to contact a second surface of the component when in the second extended state. In certain embodiments, one or more flanges 125 are affixed to the exterior of pin 105 using one or more hinges. In certain embodiments, the hinges may be two-way spring-loaded hinges.

In certain embodiments, one or more flanges 125 are located inside pin 105 when in the first retracted state. In such a scenario, one or more flanges 125 may be configured to extend substantially perpendicular to an axis 190 of pin 105 such that they can contact the second surface of the component when in the second extended state. As described in more detail below in relation to FIG. 2, in certain embodiments apparatus 100 may further comprise a mechanism for causing one or more flanges 125 to transition between the first retracted state and the second extended state.

Measurement device 130 may be any suitable measurement device for determining a grip length of a fastener for use in the aperture of the component. For example, in certain embodiments measurement device 130 may be a linear displacement metrology device. As another example, in certain embodiments measurement device 130 may be a capacitive displacement sensor. As used herein, the grip length of a fastener refers to the length from the head of a fastener down to where the threads would start. In certain embodiments, grip length may be determined based at least in part on a depth of the aperture in the component. In certain embodiments, the grip length may be derived from a measurement of a distance from a first surface of the component through the aperture to a second surface of the component to obtain a stack thickness value. Further refinement of the stack thickness value may be performed to obtain the grip length. In certain embodiments, the refinement may be performed by software associated with measurement device 130 (e.g., circuitry 175), processing circuitry 145, or by another element on data received from apparatus 110 (e.g., receiving unit 605 described below in relation to FIG. 6).

In the example embodiment of FIG. 1, measurement device 130 is a linear displacement metrology device. Linear displacement metrology device 130 includes a cylinder 165, a rod 170, and circuitry 175. Rod 170 has a first end 180 coupled to stop 115 and a second end 185 coupled to cylinder 165. Rod 170 is slidably engaged with cylinder 165. In certain embodiments, linear displacement metrology device (or, more generally, measurement device 130) may be oriented such that an axis 195 of measurement device 130 is parallel to axis 190 of pin 105.

Circuity 175 is configured to measure a distance that rod 170 has moved responsive to insertion of pin 105 into the aperture in the component. Circuitry 175 may be configured to translate a distance that rod 170 has moved relative to cylinder 165 into a measurement of the grip length of a fastener for use in the aperture in the component.

Housing 110 is affixed proximate to second end 140 of pin 105. Housing 110 may be formed from any suitable material and may have any suitable shape. For example, housing 110 may be formed of metal, plastic, any other suitable material or any suitable combination of materials. Housing 110 may include any suitable components. In the example embodiment of FIG. 1, housing 110 includes processing circuitry 145, transmitter 150, receiver 155 and one or more memory devices 160. In some cases, transmitter 150 is wireless. In certain embodiments, the functions of transmitter 150 and receiver 155 may be combined in a transceiver. One or more of processing circuitry 145, transmitter 150, receiver 155, and one or more memory devices 160 may be communicatively coupled to measurement device 130 or, more particularly with respect to the example embodiment illustrated in FIG. 1, to circuitry 175 of the linear displacement metrology device. Transmitter 150 may be configured to transmit a value indicating a determined grip length of a fastener for use in the aperture in the component. Processing circuitry 145, transmitter 150, receiver 155, and one or more memory devices 160 are described in more detail below in relation to FIG. 6.

In certain embodiments, housing 110 may include additional components beyond those illustrated in FIG. 1. For example, in certain embodiments housing 110 may include an indicator light (such as an LED light) that provides an indication to an operator when a measurement has been completed. As another example, in certain embodiments housing 110 may include a display (e.g., a digital readout or indicator light). The digital readout may, for example, display the determined grip length of the fastener for use in the component. The indicator light may provide an indication of whether measurement device 130 has obtained a successful measurement.

Although processing circuitry 145, transmitter 150, receiver 155 and one or more memory devices 160 are shown in the example of FIG. 1 in housing 110, the present disclosure contemplates that other arrangements are possible. For example, in certain embodiments pin 105 may be hollow and processing circuitry 145, transmitter 150, receiver 155, one or more memory devices 160 and the additional components described above may be included inside pin 105.

In operation, an operator using apparatus 100 inserts first end 135 of pin 105 into an aperture in a component. As first end 135 of pin 105 is inserted into the aperture, stop 115 contacts a first surface of the component. At this stage of operation, one or more flanges 125 are in the first retracted state. As pin 105 is further inserted into the aperture, pin 105 slides through stop 115, which remains pressed against the first surface of the component due to spring 120. More particularly, the movement of pin 105 while stop 115 is at rest against the first surface of the component causes compression of spring 120 (which applies force against stop 115 and causes stop 115 to remain in contact with the first surface of the component. The movement of pin 105 while stop 115 is at rest against the first surface of the component also causes rod 170 to move into cylinder 165 of measurement device 130.

As pin 105 passes through the aperture in the component, one or more flanges 125 are in a first retracted state. When first end 135 of pin 105 exits the aperture in the component, one or more flanges 125 transition to a second extended state and contact a second surface of the component. At this point, the operator of apparatus 100 may release apparatus 100, and force applied by spring 120 causes apparatus 100 to clamp against the part due to a squeezing action between stop 115 at the first surface of the component and one or more flanges 125 at the second surface of the component. Measurement device 130 (i.e., linear displacement metrology device 130 in the example embodiment of FIG. 1) measures a grip length of a fastener for use in the aperture in the component based on the amount of movement of rod 170 relative to cylinder 165 when pin 105 was inserted into the aperture.

In certain embodiments, apparatus 100 may include a timer. In such a scenario, after a set amount of time passes (e.g., the timer expires) with measurement device 130 reading a constant measurement of grip length, the measurement will be automatically recorded (e.g., in one or more memory devices 160) and transmitted by transmitter 150 toward a receiver (as described in more detail below in relation to FIG. 6). In some cases, a display may indicate whether a successful measurement has been performed (e.g., by displaying a digital readout of the measurement or illuminating an indicator light indicating a successful measurement). The operator may then remove pin 105 from the aperture. As pin 105 is removed, one or more flanges 125 will transition from the second extended state to a third retracted state (e.g., by collapsing outward when pin 105 is pulled back out of the aperture or by retracting into pin 105) to allow for removal. In certain embodiments in which one or more flanges 125 are located within pin 105 in the first retracted state, the third retracted state may be the same as the first retracted state.

Figure 2:
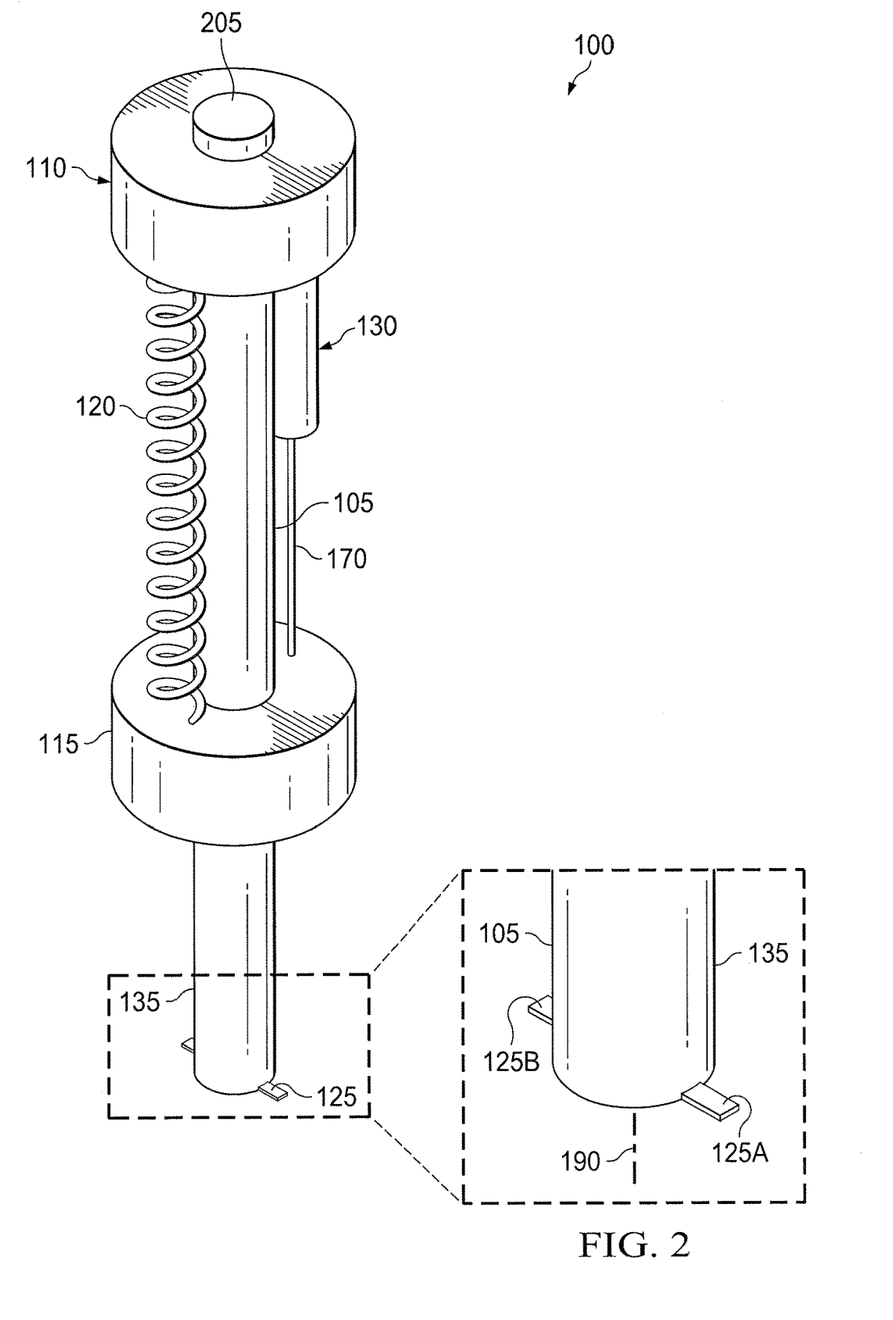
FIG. 2 illustrates another view of the example apparatus of FIG. 1, in accordance with certain embodiments.

FIG. 2 illustrates another view of apparatus 100 of FIG. 1, in accordance with certain embodiments. More particularly, FIG. 2 illustrates apparatus 100 and a close-up view of first end 135 of pin 105. As shown in the example of FIG. 2, apparatus 100 includes flanges 125A and 125B. As described above, flanges 125A and 125B may be configured to alternate between a first retracted state during insertion of pin 105 and a second extended state when first end 135 of pin 105 exits the aperture in the component. In the example of FIG. 2, flange 125A and flange 125B are shown in the second extended state.

Flanges 125 may be coupled to pin 105 in any suitable manner. For example, in certain embodiments each of flange 125A and flange 125B may be coupled to pin 105 using a hinge, as described in more detail below in relation to FIG. 3. As another example, and as shown in the example of FIG. 2, flanges 125A and 125B may be located inside pin 105 when in the first retracted state and configured to extend substantially perpendicular to axis 190 of pin 105 such that they can contact the second surface of the component when in the second extended state.

In the example of FIG. 2, apparatus 100 includes a mechanism 205 for causing flange 125A and flange 125B to transition from the first retracted state to the second extended state and from the second extended state to the first retracted state. Mechanism 205 may be any suitable mechanism. For example, mechanism 205 may be a button, which when pressed a first time causes one or more flanges 125 to transition from the first retracted state to the second extended state. In certain embodiments (as described in more detail below in relation to FIG. 5), pressing the button a second time may cause one or more flanges 125 to transition to a third retracted state that is the same as the first retracted state.

Figure 3:
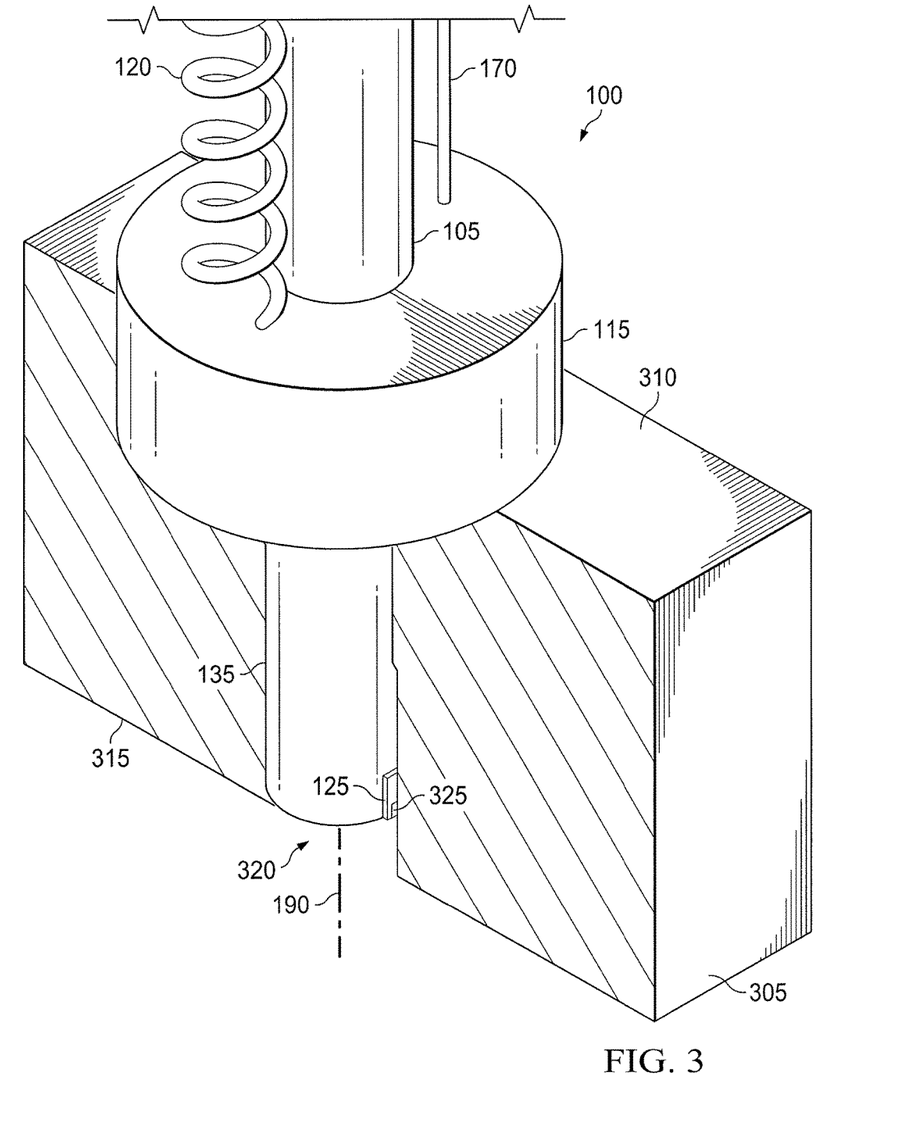
FIG. 3 illustrates the example apparatus of FIG. 1 during a first stage of operation, in accordance with certain embodiments.

FIG. 3 illustrates apparatus 100 during a first stage of operation, in accordance with certain embodiments. More particularly, FIG. 3 illustrates first end 135 of pin 105 of apparatus 100 in the initial stage of measuring a grip length of a fastener for use in a component 305. Component 305 has a first surface 310 and a second surface 315. Aperture 320 in component 305 runs through component 305 from first surface 310 to second surface 315.

As pin 105 is inserted into aperture 320 in component 305 and moves toward second surface 315, stop 115 contacts first surface 310. Because pin 105 is slidably engaged with stop 115, pin 105 continues to move through aperture 320 in component 305 toward second surface 315 while stop 115 remains in contact with first surface 310. This causes spring 120 to compress and apply force to stop 115, pressing stop 115 against first surface 310.

As shown in the example of FIG. 3, flanges 125 are in the first retracted state as pin 105 moves through aperture 320 in component 305. In the example embodiment of FIG. 3, flanges 125 are affixed to pin 105 using hinges 325 and, in the first retracted state, are flush against pin 105 and oriented substantially parallel to axis 190 of pin 105. As described above, in certain embodiments flanges 125 may be located inside pin 105 when in the first retracted state.

Figure 4:
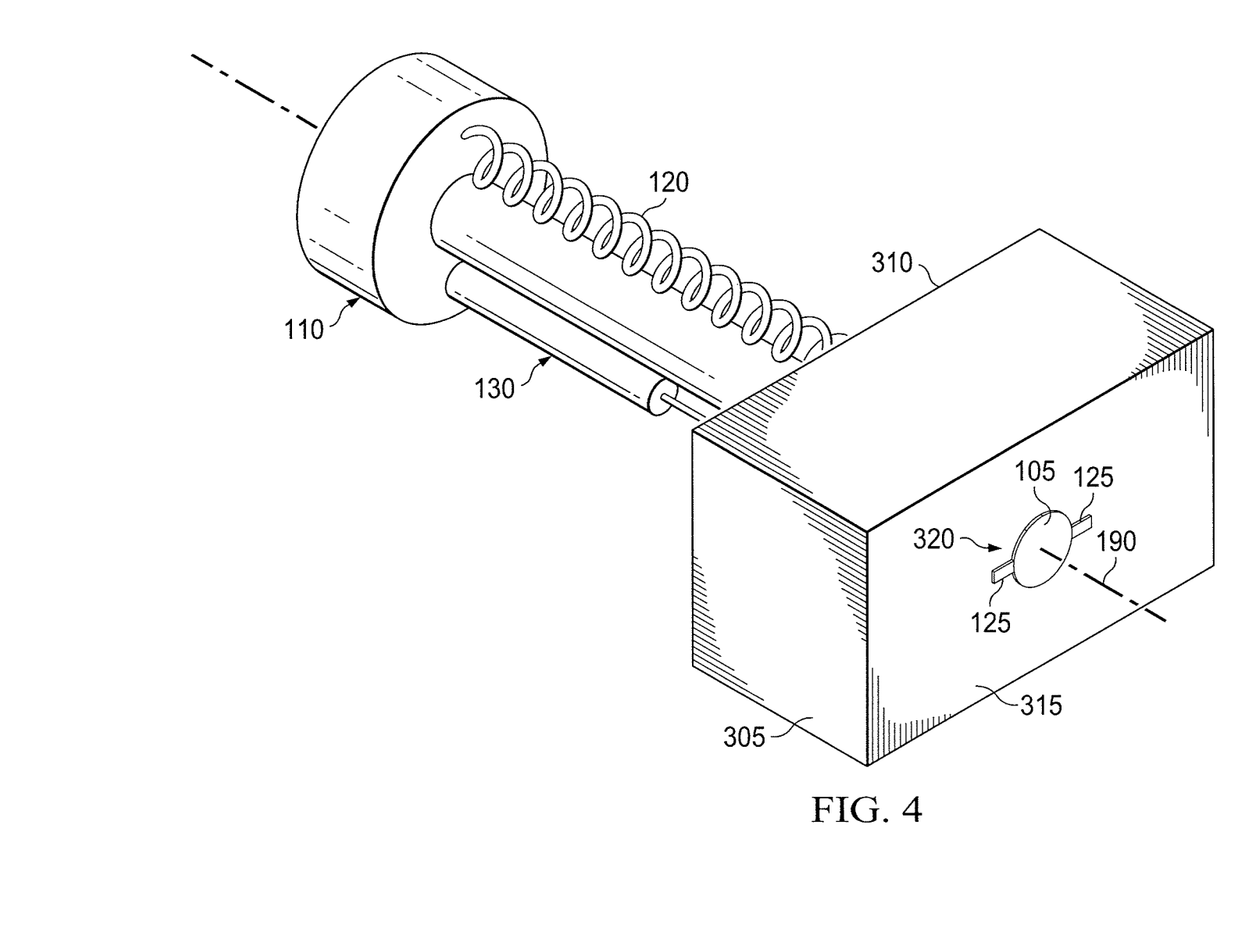
FIG. 4 illustrates the example apparatus of FIG. 1 during a second stage of operation, in accordance with certain embodiments.

FIG. 4 illustrates apparatus 100 during a second stage of operation, in accordance with certain embodiments. More particularly, FIG. 4 illustrates apparatus 100 after first end 135 of pin 105 has exited aperture 320 in component 305. As shown in the example embodiment of FIG. 4, as pin 105 passes through aperture 320 of component 305, flanges 125 transition from the first retracted state to a second extended state. In the second extended state, flanges 125 extend substantially perpendicular to axis 190 of pin 105 and contact second surface 315 of component 305.

As described above, spring 120 compresses as stop 115 contacts first surface 310 of component 305 as pin 105 passes through aperture 320 of component 305. When flanges 125 enter the second extended state and contact second surface 315 of component 305, force applied by spring 115 causes apparatus 100 to clamp component 305 between stop 115 and flanges 125. At this point, measurement device 130 may perform a measurement of the grip length of a fastener for use in aperture 320 of component 305. As described above, in certain embodiments measurement device 130 may be a linear displacement metrology device. In such a scenario, circuitry 175 of measurement device 130 may determine a grip length based on the movement of rod 170 relative to cylinder 165.

In certain embodiments, measurement device 130 may send measurement information to processing circuitry in housing 110 (e.g., processing circuitry 145 described above in relation to FIG. 1). The processing circuitry may utilize transmitter 155 to transmit a value indicating the measurement of the grip length of the fastener for use in aperture 320 (e.g., the actual measurement or any suitable indication thereof) to another component (e.g., a receiver in wireless communication with transmitter 155). In certain embodiments, measurement device 130 may wait to provide the measurement of grip length to the processing circuitry 145 until it reads a consistent measurement of the grip length for a certain period of time (e.g., as measured by a timer associated with measurement device 130). The period of time may be any suitable time period. For example, in certain embodiments the time period may be 0.5 seconds. In some cases, the measurement information may be automatically provided upon expiration of the timer. This may advantageously require no additional action on the part of an operator of apparatus 100.

In some cases, apparatus 100 may provide an indication to the operator of apparatus 100 after successfully reading a measurement of the grip length. The indication may be provided in any suitable manner. As one example, the indication may be an LED light that indicates whether a measurement of the grip length has been successfully obtained (e.g., a green LED light may indicate a successful measurement). As another example, the indication may be an audible signal (e.g., a beep) that indicates to the operator of apparatus 100 that a measurement of the grip length has been successfully obtained.

Figure 5:
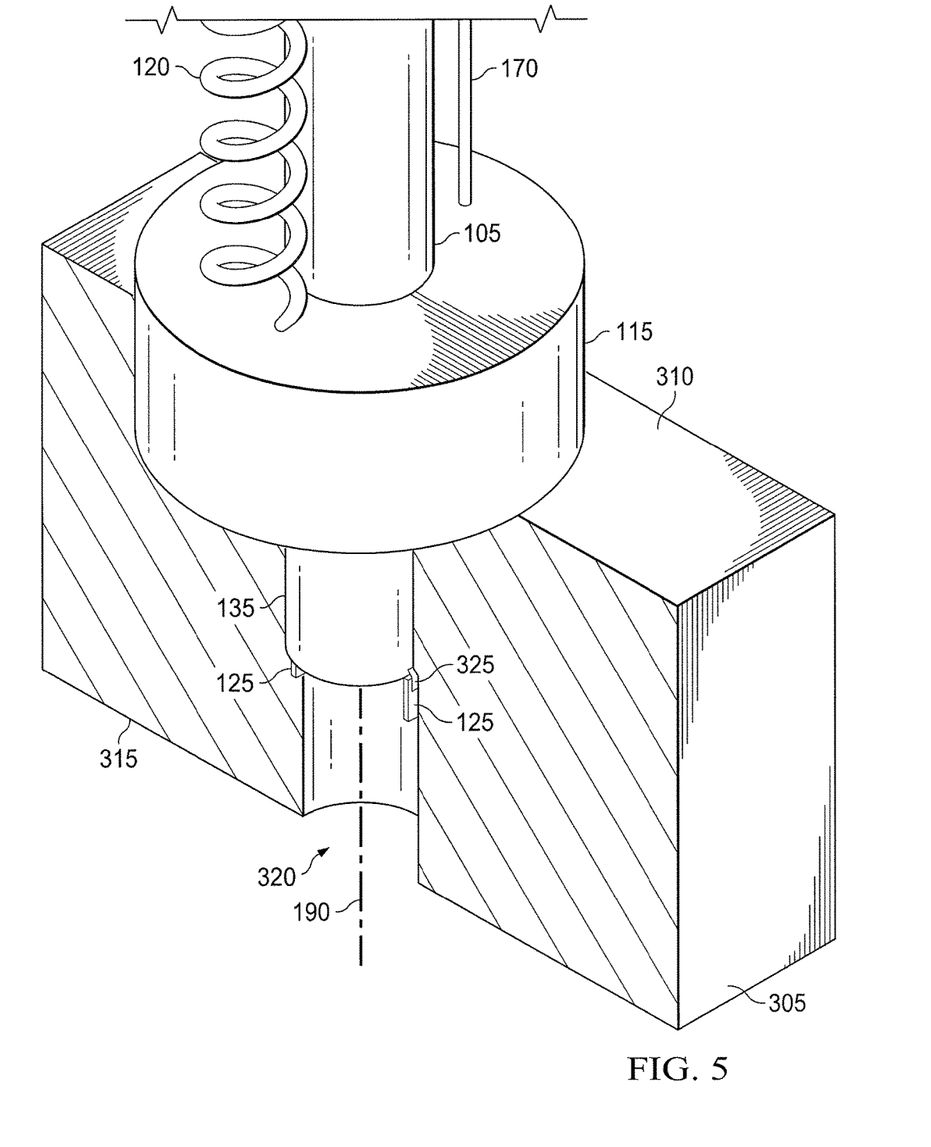
FIG. 5 illustrates the example apparatus of FIG. 1 during a third stage of operation, in accordance with certain embodiments.

FIG. 5 illustrates apparatus 100 during a third stage of operation, in accordance with certain embodiments. More particularly, FIG. 5 illustrates pin 105 being removed from aperture 320 in component 305. The stage of operation illustrated in FIG. 5 may, for example, occur after a successful measurement of the grip length of a fastener for use in aperture 320 in component 305 has been obtained.

As shown in the example of FIG. 5, flanges 125 are shown in a third retracted state as pin 105 moves out of aperture 320 in component 305. In the example embodiment of FIG. 5, flanges 125 are affixed to pin 105 using hinges 325. As pin 105 is removed from aperture 320 in component 305, flanges 125 transition to the third retracted state. In the third retracted state, flanges 125 are oriented toward second surface 315 of component 305 and substantially parallel to axis 190 of pin 105. This may advantageously enable pin 105 to be easily removed from aperture 320 in component 305.

In certain embodiments, flanges 125 may be located inside pin 105 when in the third retracted state. Similar to the transition from the first retracted state to the second extended state described above in relation to FIG. 2, an operator may use a mechanism, such as mechanism 205 described above, to transition flanges 125 from the second extended state to the third retracted state. For example, in embodiments in which mechanism 205 is a button, the operator may press the button a second time (the first time being when the button was depressed to cause the transition from the first retracted state to the second extended state, as described above in relation to FIG. 2) in order to cause flanges 125 to transition from the second extended state to the third retracted state. In such a scenario, the third retracted state may be the same as the first retracted state.

Figure 6:
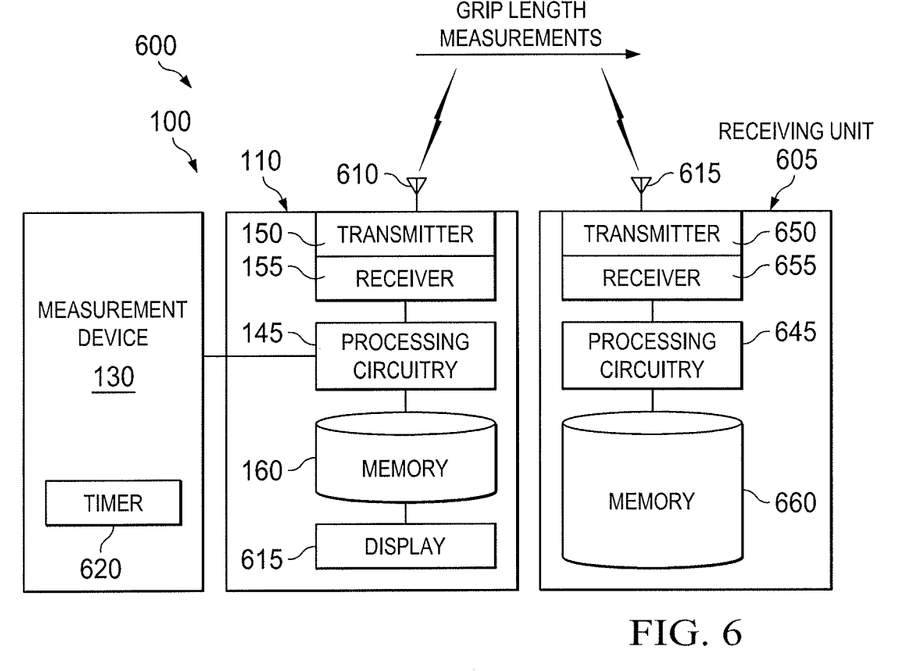
FIG. 6 is a schematic diagram of a system employing the example apparatus of FIG. 1, in accordance with certain embodiments.

FIG. 6 is a schematic diagram of a system employing the example apparatus of FIG. 1, in accordance with certain embodiments. System 600 includes apparatus 100 and receiving unit 605. Apparatus 100 includes housing 110 and measurement device 130. In the example embodiment of FIG. 6, housing 110 includes processing circuitry 145, transmitter 150, receiver 155, one or more memory devices 160, antenna 610 and display 615. Measurement device 130 includes timer 620. As described above, in certain embodiments the functions of transmitter 150 and receiver 155 may be combined into a transceiver. In some cases, housing 110 may not include receiver 155.

In the example embodiment of FIG. 6, measurement device 130 is communicatively coupled to processing circuitry 145 in housing 110. Although depicted in FIG. 6 as located outside housing 110, in certain embodiments one or more components of measurement device 130 may be included in housing 110. For example, in certain embodiments circuitry 175 described above may be contained in housing 110. In addition, apparatus 100 may include the various additional elements of apparatus 100 described above in relation to FIGS. 1-5.

Receiving unit 605 includes antenna 615, processing circuitry 645, transmitter 650, receiver 655, and one or more memory devices 660. In certain embodiments, receiving unit 605 may not include transmitter 650. Receiving unit 605 may include additional elements beyond those shown in FIG. 6. For example, in certain embodiments receiving unit 605 may include an input device (e.g., a keyboard, touchscreen, or other suitable input device) and a display device.

Processing circuitry 145 may be any electronic circuitry, including, but not limited to microprocessors, application specific integrated circuits (ASIC), application specific instruction set processor (ASIP), and/or state machines, that communicatively couples to one or more of measurement device 130, transmitter 150, receiver 155 (or, in some cases, a transceiver), one or more memory devices 160, display 615, and timer 620 and controls one or more operations of apparatus 100. Processing circuitry 145 may be 8-bit, 16-bit, 32-bit, 64-bit or of any other suitable architecture. Processing circuitry 145 may include an arithmetic logic unit (ALU) for performing arithmetic and logic operations, processor registers that supply operands to the ALU and store the results of ALU operations, and a control unit that fetches instructions from one or more memory devices 160 and executes them by directing the coordinated operations of the ALU, registers and other components. Processing circuitry 145 may include other hardware and software that operates to control and process information. Processing circuitry 145 executes software stored on one or more memory devices 160 to perform any of the functions described herein. Processing circuitry 145 controls one or more operations of apparatus 100 by processing information received by or from measurement device 130, transmitter 150, receiver 155, and one or more memory devices 160. Processing circuitry 145 may be a programmable logic device, a microcontroller, a microprocessor, any suitable processing device, or any suitable combination of the preceding. Processing circuitry 145 is not limited to a single processing device and may encompass multiple processing devices.

Transmitter 150 and receiver 155 (or, in certain embodiments, a transceiver) facilitate transmitting wireless signals from apparatus 100 to receiving unit 605 and receiving wireless signals at apparatus 100 from receiving unit 605, respectively. Transmitter 150 and receiver 155 may be any suitable devices operable to transmit and receive information, respectively. In some cases, transmitter 150 and receiver 155 may perform suitable processing of the information, communicate to other devices in addition to receiving unit 605, or any combination of the preceding. For example, transmitter 150 may transmit a value indicating a determined measurement of grip length of a fastener (e.g., the determined measurement or any suitable indication thereof) to a computing device, such as receiving unit 605 and/or any other suitable component. Receiver 155 may receive data from receiving unit 605 and/or any other suitable component. Transmitter 150 and receiver 155 may include any suitable hardware and/or software, including protocol conversion and data processing capabilities, to communicate through a LAN, WAN, or other communication systems that allows apparatus 100 to exchange information with other components.

Transmitter 150 may be communicatively coupled to measurement device 130. Transmitter 150 is configured to communicate to receiving unit 605 a value indicating a determined grip length of a fastener for use in the aperture in the component.

One or more memory devices 160 may store, either permanently or temporarily, data (e.g., determined measurements of grip length), operational software, or other information for processing circuitry 145. One or more memory devices 160 may include any one or a combination of volatile or non-volatile local or remote devices suitable for storing information. For example, one or more memory devices 160 may include random access memory (RAM), read only memory (ROM), magnetic storage devices, optical storage devices, or any other suitable information storage device or a combination of these devices. The software represents any suitable set of instructions, logic, or code embodied in a computer-readable storage medium. For example, the software may be embodied in memory 120, a disk, a compact disc (CD), or a flash drive. In particular embodiments, the software may include an application executable by processing circuitry 145 to perform one or more of the functions of apparatus 100 described herein.

Display 615 may be any suitable display. For example, in certain embodiments display 615 may be a digital readout or an indicator light (e.g., an LED light). In some cases, display 615 may indicate whether a successful measurement has been performed (e.g., by displaying a digital readout of the measurement or illuminating an indicator light indicating a successful measurement). The indication may be provided in any suitable manner. As one example, the indication may be an LED light that indicates whether a measurement of the grip length has been successfully obtained (e.g., a green LED light may indicate a successful measurement). In certain embodiments, apparatus 100 may include any suitable combination of hardware or software to provide an audible indication to an operator of apparatus 100. For example, the indication may be an audible signal (e.g., a beep) that indicates to the operator of apparatus 100 that a measurement of the grip length has been successfully obtained.

Measurement device 130 may use timer 620 to determine when to send measurement information. In certain embodiments, measurement device 130 may wait to provide a measurement of grip length to processing circuitry 145 until it reads a consistent measurement of the grip length for a certain period of time (e.g., as measured by timer 620 associated with measurement device 130). The period of time may be any suitable time period. For example, in certain embodiments the time period may be 0.5 seconds. In some cases, the measurement information may be automatically provided upon expiration of timer 620.

Processing circuitry 645, transmitter 650, receiver 655, and one or more memory devices 660 of receiving unit 605 may have analogous characteristics to processing circuitry 145, transmitter 150, receiver 155, and one or more memory devices 160 described above. For example, these components of receiving unit 605 may be implemented using any of the hardware/software described above with respect to apparatus 100. Thus, for the sake of brevity, only differences will be described.

In the example embodiment of FIG. 6, processing circuitry 645 communicatively couples to one or more of transmitter 650, receiver 655 (or, in some cases, a transceiver), and one or more memory devices 660 and controls one or more operations of receiving unit 605. Processing circuitry 645 executes software stored on one or more memory devices 660 to perform any of the functions of receiving unit 605 described herein. Processing circuitry 645 controls one or more operations of receiving unit 605 by processing information received by or from transmitter 650, receiver 655, and one or more memory devices 660.

Transmitter 650 and receiver 655 (or, in certain embodiments, a transceiver) facilitate transmitting wireless signals to apparatus 100 from receiving unit 605 and receiving wireless signals at receiving unit 605 from apparatus 100, respectively. In certain embodiments, receiver 655 may receive a value indicating a measurement of grip length of a fastener (e.g., the actual measurement or any suitable indication thereof) from apparatus 100.

One or more memory devices 660 may store, either permanently or temporarily, data (e.g., received measurements of grip length), operational software, or other information for processing circuitry 645.

Figure 7:
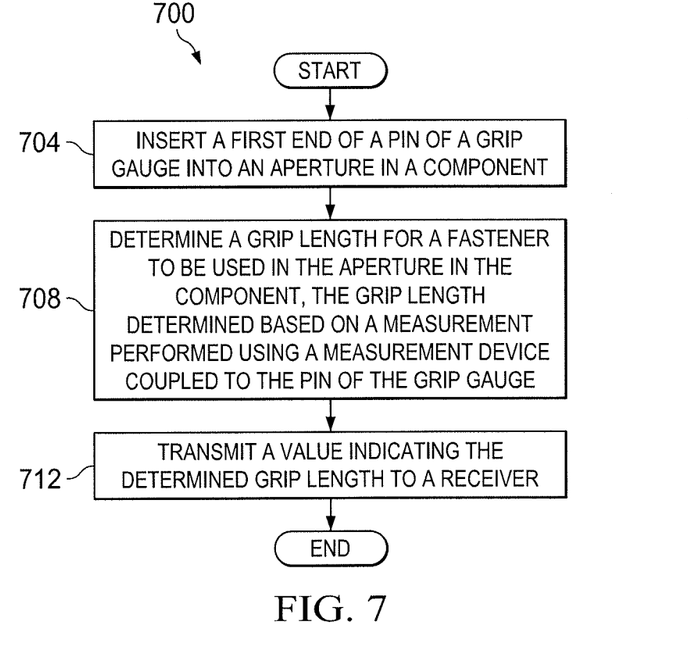
FIG. 7 is a flow diagram of a method utilizing the example apparatus of FIG. 1, in accordance with certain embodiments.

FIG. 7 is a flow diagram of a method 700, in accordance with certain embodiments. Method 700 begins at step 704, where a first end of a pin of a grip gauge is inserted into an aperture in a component. In certain embodiments, the grip gauge may comprise: a pin having a first end configured for insertion in the aperture in the component; a stop slidably engaged with the pin and configured to contact a first surface of the component as the pin is inserted into the aperture in the component; a spring coupling the stop to the housing; one or more flanges located proximate to the first end of the pin, the one or more flanges configured to contact a second surface of the component; and a transmitter communicatively coupled to the linear displacement metrology device and configured to transmit a value indicating the determined grip length to the receiver.

In certain embodiments, the grip gauge may comprise one or more flanges located proximate to the first end of the pin. The one or more flanges may be configured to contact a second surface of the component, and the one or more flanges may be configured to transition between a first retracted state during insertion of the pin and a second extended state when the first end of the pin passes through the aperture in the component. In certain embodiments, the one or more flanges may be affixed to the exterior of the pin using one or more hinges. In certain embodiments, the one or more flanges may be located inside the pin when in the first retracted state, and the one or more flanges may be configured to extend perpendicular to the pin such that they can contact the second surface of the component when in the second extended state. The method may comprise causing the one or more flanges to transition between the first retracted state and the second extended state.

At step 708, a grip length for a fastener to be used in the aperture in the component is determined, the grip length determined based on a measurement performed using a measurement device coupled to the pin of the grip gauge. In certain embodiments, the measurement device may comprise a linear displacement metrology device. The linear displacement metrology device may comprise: a cylinder; a rod having a first end coupled to the stop and a second end coupled to the cylinder, wherein the rod is slidably engaged with the cylinder. The method may comprise measuring a distance that the rod has moved responsive to insertion of the pin into the aperture, the distance that the rod has moved corresponding to the grip length.

At step 712, an indication of the determined grip length is transmitted to a receiver. In certain embodiments, transmitting the determined grip length to the receiver may comprise wirelessly transmitting the determined grip length to the receiver.

Modifications, additions, or omissions may be made to the systems and apparatuses described herein without departing from the scope of the disclosure. The components of the systems and apparatuses may be integrated or separated. Moreover, the operations of the systems and apparatuses may be performed by more, fewer, or other components. Additionally, operations of the systems and apparatuses may be performed using any suitable logic comprising software, hardware, and/or other logic. As used in this document, "each" refers to each member of a set or each member of a subset of a set.

Modifications, additions, or omissions may be made to the methods described herein without departing from the scope of the disclosure. The methods may include more, fewer, or other steps. Additionally, steps may be performed in any suitable order.

Although this disclosure has been described in terms of certain embodiments, alterations and permutations of the embodiments will be apparent to those skilled in the art. Accordingly, the above description of the embodiments does not constrain this disclosure. Other changes, substitutions, and alterations are possible without departing from the spirit and scope of this disclosure, as defined by the following claims.

The invention claimed is:
1. An apparatus, comprising:
   a pin comprising a first end configured for insertion in an aperture in a component;
   a housing affixed proximate to a second end of the pin;
   a stop slidably engaged with the pin and configured to contact a first surface of the component as the pin is inserted into the aperture in the component;
   a spring coupling the stop to the housing, the spring configured to compress when the stop contacts the first surface of the component as the pin is inserted in the aperture in the component;
   one or more flanges located proximate to the first end of the pin, the one or more flanges configured to transition between a first retracted state during insertion of the pin and a second extended state when the first end of the pin passes through the aperture in the component, the one or more flanges configured to contact a second surface of the component when in the second extended state;
   a linear displacement metrology device coupled to the pin such that an axis of the linear displacement metrology device is substantially aligned with an axis of the pin;
   a transmitter communicatively coupled to the linear displacement metrology device, the transmitter located in the housing and configured to communicate to a receiver a value indicating a grip length of a fastener for use in the aperture in the component; and
   a button for causing the one or more flanges to transition between a first retracted state and a second extended state in response to a user pressing the button and further for causing the one or more flanges to transition between the second extended state and a third retracted state that is the same as the first retracted state in response to the user pressing the button again.

2. The apparatus of claim 1, wherein the linear displacement metrology device transformer comprises:
   a cylinder;
   a rod having a first end coupled to the stop and a second end coupled to the cylinder, wherein the rod is slidably engaged with the cylinder; and
   circuitry configured to measure a distance that the rod has moved responsive to insertion of the pin into the aperture, the distance that the rod has moved corresponding to the grip length of the fastener for use in the aperture in the component.

3. The apparatus of claim 1, wherein the one or more flanges are affixed to the exterior of the pin using one or more hinges.

4. The apparatus of claim 1, wherein:
   the one or more flanges are located inside the pin when in the first retracted state;
   the one or more flanges are configured to extend perpendicular to the axis of the pin such that they can contact the second surface of the component when in the second extended state; and
   the apparatus comprises a mechanism for causing the one or more flanges to transition between the first retracted state and the second extended state.

5. The apparatus of claim 1, and further comprising a timer configured to determine when the transmitter is to communicate to the receiver the grip length of the aperture in the component.

6. An apparatus, comprising:
   a pin comprising a first end configured for insertion in an aperture in a component;
   a stop slidably engaged with the pin and configured to contact a first surface of the component as the pin is inserted into the aperture in the component;
   a spring coupled to the stop;
   one or more flanges located proximate to the first end of the pin, the one or more flanges configured to contact a second surface of the component;
   a measurement device coupled to the pin;
   a transmitter communicatively coupled to the measurement device and configured to communicate to a receiver a value indicating a grip length of the aperture in the component; and
   a timer configured to determine when the transmitter is to communicate to the receiver the grip length of the aperture in the component.

7. The apparatus of claim 6, wherein the spring is configured to compress when the stop contacts the first surface of the component during placement of the pin in the aperture in the component.

8. The apparatus of claim 6, wherein the one or more flanges are configured to transition between a first retracted state during insertion of the pin and a second extended state when the first end of the pin passes through the aperture in the component.

9. The apparatus of claim 8, wherein:
   the one or more flanges are located inside the pin when in the first retracted state;
   the one or more flanges are configured to extend from the pin such that they contact the second surface of the component when in the second extended state; and
   the grip gauge comprises a mechanism for causing the one or more flanges to transition between the first retracted state and the second extended state.

10. The apparatus of claim 6, wherein:
    the transmitter is located in a housing affixed proximate to a second end of the pin.

11. The apparatus of claim 6, wherein the measurement device comprises:
    a linear differential transformer, comprising:
      a cylinder;
      a rod having a first end coupled to the stop and a second end coupled to the cylinder, wherein the rod is slidably engaged with the cylinder; and
      circuitry configured to measure a distance that the rod has moved responsive to insertion of the pin into the aperture, the distance that the rod has moved corresponding to a grip length of a fastener for use in the aperture in the component.

12. The apparatus of claim 6 wherein the timer is configured to determine that the transmitter is to communicate the grip length when the value is consistent for a certain amount of time.

13. The apparatus of claim 6 wherein the timer is configured to determine that the transmitter is to communicate the grip length after a certain amount of time.

14. The apparatus of claim 6, and further comprising a mechanism for causing the one or more flanges to transition between a first retracted state and a second extended state in response to input from a user and further for causing the one or more flanges to transition between the second extended state and a third retracted state that is the same as the first retracted state in response to an additional input from a user.

15. A method, comprising:
    inserting a first end of a pin of a grip gauge into an aperture in a component;

determining a grip length for a fastener to be used in the aperture in the component, the grip length determined based on a measurement performed using a measurement device coupled to the pin of the grip gauge;
wherein the grip gauge comprises:
  a pin having a first end configured for insertion in the aperture in the component;
  a stop slidably engaged with the pin and configured to contact a first surface of the component as the pin is inserted into the aperture in the component;
  a spring coupling the stop to the housing;
  one or more flanges located proximate to the first end of the pin, the one or more flanges configured to contact a second surface of the component;
  a transmitter communicative coupled to the linear displacement metrology device and configured to transmit the value indicating the determined grip length to the receiver; and
  a mechanism for causing the one or more flanges to transition between a first retracted state and a second extended state in response to input from a user and further for causing the one or more flanges to transition between the second extended state and a third retracted state that is the same as the first retracted state in response to an additional input from a user; and
transmitting a value indicating the determined grip length to a receiver.

16. The method of claim 15, wherein transmitting the value indicating the determined grip length to the receiver comprises wirelessly transmitting the value indicating the determined grip length to the receiver.

17. The method of claim 15, wherein the measurement device comprises:
  a linear displacement metrology device, comprising:
    a cylinder;
    a rod having a first end coupled to the stop and a second end coupled to the cylinder, wherein the rod is slidably engaged with the cylinder; and
    the method comprises measuring a distance that the rod has moved responsive to insertion of the pin into the aperture, the distance that the rod has moved corresponding to the grip length.

18. The method of claim 15, wherein the one or more flanges are affixed to the exterior of the pin using one or more hinges.

19. The method of claim 15, wherein:
the one or more flanges are located inside the pin when in the first retracted state; and
the one or more flanges are configured to extend perpendicular to the pin such that they can contact the second surface of the component when in the second extended state.

20. The method of claim 15, wherein the measurement device further comprises a timer configured to determine when the transmitter is to communicate to the receiver the grip length of the aperture in the component.

* * * * *